United States Patent
Liu et al.

(10) Patent No.: US 8,972,471 B2
(45) Date of Patent: Mar. 3, 2015

(54) ARITHMETIC MODULE, DEVICE AND SYSTEM

(75) Inventors: Chih-Wei Liu, Hsinchu (TW); Kuo-Chiang Chang, Hsinchu (TW); Shih-Hao Ou, Hsinchu (TW); Yu-Wen Chen, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 346 days.

(21) Appl. No.: 13/611,146

(22) Filed: Sep. 12, 2012

(65) Prior Publication Data

US 2013/0311529 A1    Nov. 21, 2013

(30) Foreign Application Priority Data

May 17, 2012    (TW) .............................. 101117524 A

(51) Int. Cl.
G06F 7/483    (2006.01)

(52) U.S. Cl.
USPC ....................................................... 708/501

(58) Field of Classification Search
None
See application file for complete search history.

(56) References Cited

U.S. PATENT DOCUMENTS

| 7,676,535 | B2 * | 3/2010 | Donofrio et al. | 708/495 |
|---|---|---|---|---|
| 2002/0194240 | A1 * | 12/2002 | Pangal et al. | 708/501 |
| 2003/0041082 | A1 * | 2/2003 | Dibrino | 708/501 |
| 2005/0223053 | A1 * | 10/2005 | Lin et al. | 708/495 |
| 2012/0011181 | A1 * | 1/2012 | Samy et al. | 708/204 |
| 2013/0311529 | A1 * | 11/2013 | Liu et al. | 708/209 |
| 2014/0136587 | A1 * | 5/2014 | Goveas et al. | 708/501 |

OTHER PUBLICATIONS

Chen et al., "Design and Implementation of Lightweight Processing Element for Digital Hearing Aids", A Thesis Submitted to Department of Electronics Engineering & Institute of Electronics, College of Electrical and Computer Engineering, National Chiao Tung University (Nov. 2011).

* cited by examiner

Primary Examiner — David H Malzahn
(74) Attorney, Agent, or Firm — Mintz Levin Cohn Ferris Glovsky and Popeo, P.C.; Peter F. Corless; Steven M. Jensen

(57) ABSTRACT

An arithmetic module is provided, including a first adder, a first shifter coupled to the first adder, a multiplier coupled to the first shifter for receiving an external coefficient signal, a digit alignment unit coupled to the multiplier, a second adder coupled to the digit alignment unit, and a second shifter coupled to the second adder. The arithmetic module reduces the overall computation time effectively, as compared with a scalar processor, by employing a serial data connection design, and also significantly reduces power consumption of the digital signal processor by requiring fewer input and output ends than those of a multi-issue processor.

9 Claims, 2 Drawing Sheets

ARITHMETIC MODULE, DEVICE AND SYSTEM

CROSS-REFERENCES TO RELATED APPLICATIONS

This application claims under 35 U.S.C. §119(a) the benefit of Taiwanese Application No. 101117524, filed May 17, 2012, the entire contents of which is incorporated herein by reference.

BACKGROUND OF THE INVENTION

1. Field of the Invention

The present invention relates to arithmetic modules, devices and systems, and, more particularly, to an arithmetic module, device and system for digital signal processors.

2. Description of Related Art

With the rapid development of mobile devices in the electronics industry, thin, lightweight and high performance electronic products are under demand. However, with the decreasing size of the mobile devices, the battery capacity is also reduced. Therefore, reducing the power consumption of electronic components in mobile devices to extend battery life has become an important subject.

Moreover, due to the increasingly shorter life cycle of today's electronic products, programmable core circuits that enable most system functionalities to be realized as software and allow designers to readily adjust the functions through the flexibility of the software, which increases the repeated utilization rate as well as shortens the design period, are also the current trend of electronic products. For example, a digital signal processor (DSP) is a programmable general-purpose processor that has an instruction set and architecture designed specifically for digital signal applications.

However, conventional DSPs employ scalar or multi-issue processors. Scalar processors have poor computation performance because they can only process one instruction at a time. If one wishes to raise the computation performance of the scalar processors, increases in the footprint or the power consumption become an issue. On the other hand, multi-issue processors arrange computation units in parallel, which perform computation in parallel, so each instruction has a shorter computation period. However, complexity in the hardware of the input and output ends of the multi-issue processors increases accordingly. For example, in a Very Long Instruction Word (VLIW) processor, for N arithmetic units, the input and output ports of their registers will cause the footprint and delay to increase proportionally by $N^3$ and $N^{3/2}$.

Therefore, how to improve the arithmetic modules of the digital signal processors in order to reduce power consumption has become a subject in this field ready to be solved.

SUMMARY OF THE INVENTION

In light of the foregoing drawbacks, an objective of the present invention is to provide an arithmetic module designed to have a serial data connection, comprising: a first adder including two input ends for receiving external data signals and an output end for outputting first addition result signals; a first shifter coupled to the output end of the first adder for receiving the first addition result signals generated by the first adder; a multiplier including a first input end coupled to the first shifter, a second input end for receiving an external coefficient, and an output end for outputting multiplication result signals; a digit alignment unit coupled to the output end of the multiplier for receiving the multiplication result signals generated by the multiplier to align digits of the multiplication result signals with those of input signals from an external accumulative register; a second adder including two input ends coupled to the digit alignment unit, and an output end for outputting second addition result signals; and a second shifter coupled to the output end of the second adder for receiving the second addition result signals generated by the second adder and outputting a second shift result signals to the external accumulative register.

In an embodiment, the digit alignment unit further includes a multiplexer including a third input end for receiving the multiplication result signals from the multiplier, a fourth input end for receiving the input signals from the external accumulative register, and two output ends; and a third shifter coupled to one of the output ends of the multiplexer, wherein the multiplexer selects the multiplication result signals from the multiplier or the input signal from the external accumulative register as the input signals for the third shifter based on a predetermined control rule.

In addition, the arithmetic module employs peak-value analysis on known coefficients to estimate the maximum value that can be possibly generated during execution, and further uses the first shifter and the second shifter to normalize values of the first addition result signals and the second addition result signals to between 0.5 and 1, respectively.

The present invention further provides an arithmetic device, which includes a controller including a plurality of input ends for receiving external signals and data and a plurality of output ends for outputting resulting signals of the arithmetic device and control signals; a storage unit coupled to the controller for receiving the control signals from the controller and outputting stored microinstructions, data and coefficients accordingly; and an arithmetic module for receiving the microinstructions and data from the storage unit and performing arithmetic operations.

The present invention further provides an arithmetic system, which includes a data memory; a program memory for storing control instruction sets; an arithmetic device; and a processor coupled with the data memory, the program memory and the arithmetic device, wherein the behavior of the processor is dictated by control codes written by a programmer to directly perform arithmetic operations or control the arithmetic device to perform arithmetic operations.

Compared to the prior art, the arithmetic module of the present invention effectively reduces the overall computation time by employing a serial data connection design when compared with a scalar processor which only processes a single operation with one instruction, and also significantly reduces power consumption of the digital signal processor by requiring less input and output ends than those of a multi-issue processor.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention.

Figure 1:
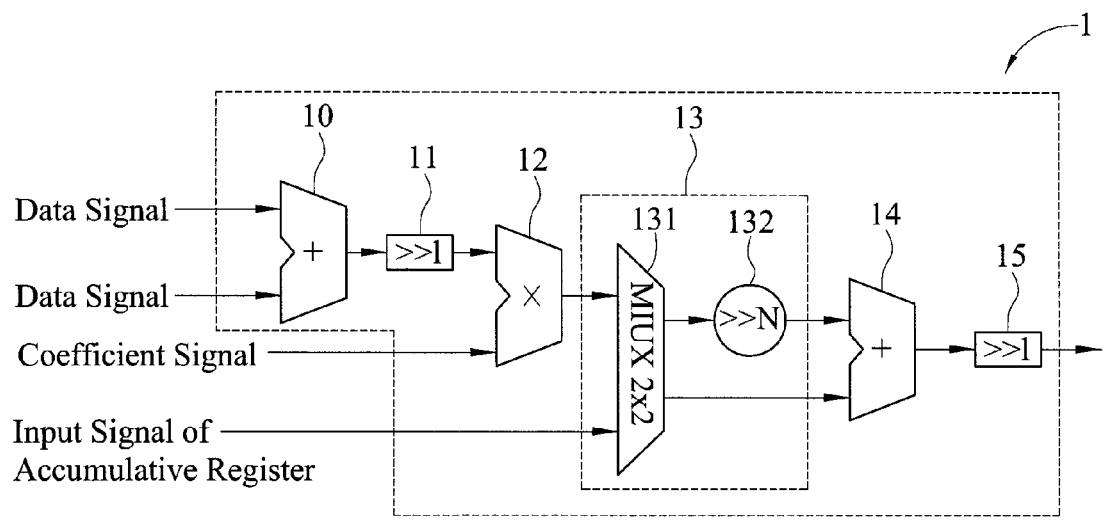
FIG. 1 is a schematic diagram illustrating an embodiment of an arithmetic module according to the present invention.

FIG. 1 is a schematic diagram illustrating an embodiment of an arithmetic module 1 according to the present invention. The arithmetic module 1 includes a first adder 10, a first shifter 11, a multiplier 12, a digit alignment unit 13, a second adder 14 and a second shifter 15. The arithmetic module 1 employs a design of serial data connection to avoid hardware complexity in the input and output ends as a result of parallel arrangement of the arithmetic units in the conventional multi-issue processors.

The first adder 10 has two input ends for receiving external data signals and an output end for outputting first addition result signals.

The first shifter 11 is coupled to the output end of the first adder 10 for receiving the first addition result signals generated by the first adder 10.

In an embodiment, the arithmetic module 1 is based on a Static Floating Point (SFP) algorithm that employs the first shifter 11 to normalize the values of the first addition result signal to between 0.5 and 1. The SFP algorithm employs the decimal fixed-point representation, in which the maximum value representing the digits is rounded off if it is too small during computation in order to increase the utilization rate of the digits. During the design phase, peak-value analysis is first used to record when it is required to adjust the data digits so as to avoid the occurrence of overflow. These operations are done employing static-time analysis, which saves more power when compared to floating-point operations that manage digit alignment and normalization in dynamic time. In addition, since the maximum value of the first addition result signals after peak-value analysis are normalized to between 0.5 and 1, better utilization rate of data digitals and computational accuracy can be provided. Since SFP algorithm calculates the range of middle register values and shifting register values by using software such as C model in static time, the digit required for representing the decimal point location can be omitted. Thus, the arithmetic module of the present invention has the accuracy of floating-point representation as well as the low hardware complexity of fixed-point representation.

The multiplier 12 has a first input end coupled to the first shifter 11, a second input end for receiving external coefficient signals, and an output end for outputting multiplication result signals.

The digit alignment unit 13 is coupled to the output end of the multiplier 12 for receiving the multiplication result signals generated by the multiplier 12 to align digits of the multiplication result signals with those of input signals from an external accumulative register.

In an embodiment, the digit alignment unit 13 further includes a multiplexer 131 and a third shifter 132.

The multiplexer 131 has a third input end for receiving the multiplication result signals from the multiplier 12, a fourth input end for receiving the input signals from the external accumulative register, and two output ends.

The third shifter 132 is coupled to one of the output ends of the multiplexer 131, wherein the multiplexer 131 selects the multiplication result signals from the multiplier 12 or the input signals from the external accumulative register as the input signals of the third shifter 132 based on a predetermined control rule.

The second adder 14 has two input ends coupled to the digit alignment unit 13, and an output end for outputting second addition result signals.

The second shifter 15 is coupled to the output end of the second adder 14 for receiving the second addition result signals generated by the second adder 14 and for outputting second shift result signals to the external accumulative register.

In an embodiment, the arithmetic module 1 normalizes the values of the second addition result signals to between 0.5 and 1 by using the second shifter 15 according to the SFP algorithm.

Figure 2:
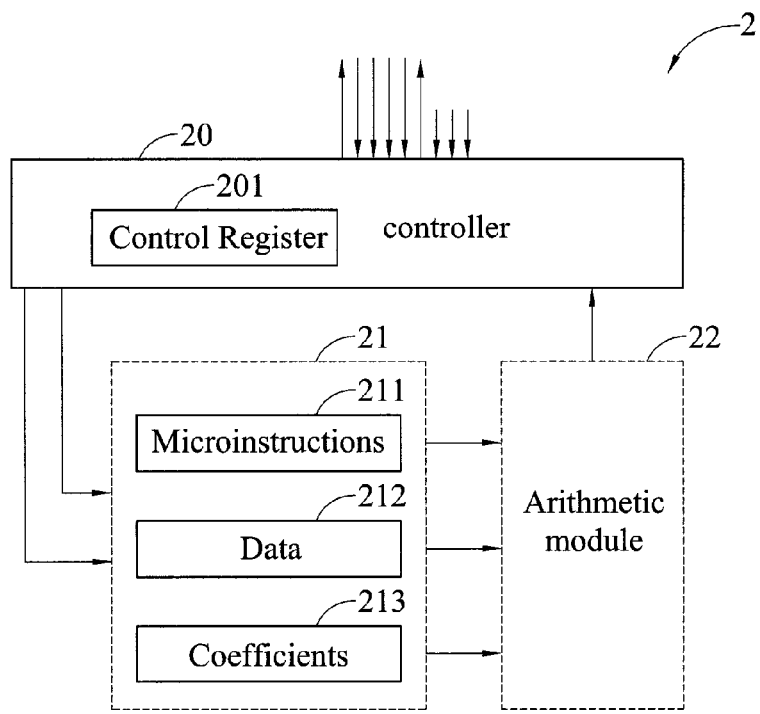
FIG. 2 is a schematic diagram illustrating an embodiment of an arithmetic device according to the present invention.

FIG. 2 is a schematic diagram illustrating an embodiment of an arithmetic device 2 according to the present invention. The arithmetic device 2 includes a controller 20, a storage unit 21 and an arithmetic module 22.

The controller 20 has a plurality of input ends for receiving external signals and data and a plurality of output ends for outputting resulting signals of the arithmetic device and control signals.

In an embodiment, the controller 20 further includes a control register 201 for storing a head address, a tail address, a delay line start address, a delay line end address, a coefficient start address and a microinstruction start address.

The storage unit 21 is coupled to the controller 20 for receiving the control signals of the controller 20 and outputting stored microinstructions 211, data 212 and coefficients 213 accordingly.

The arithmetic module 22 is used for receiving the instructions and data from the storage unit 21 for arithmetic operations, and has the same structure as the arithmetic module 1.

Figure 3:
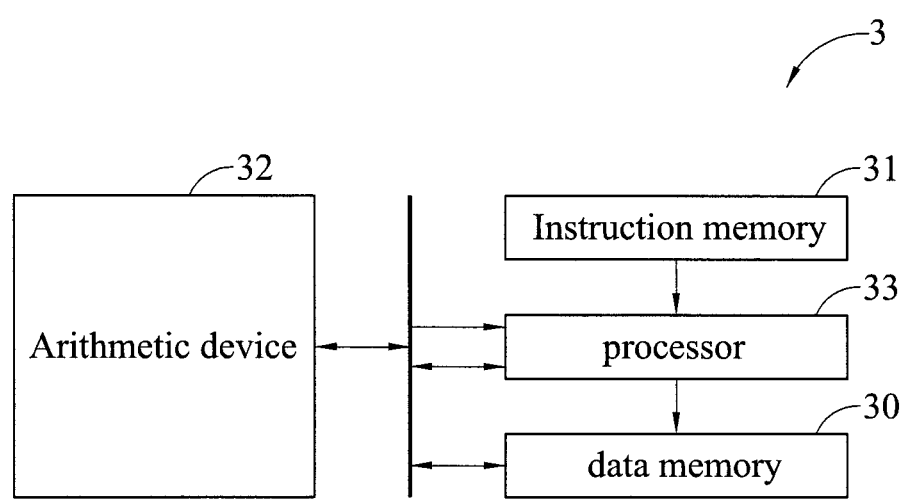
FIG. 3 is a schematic diagram illustrating an embodiment of an arithmetic system according to the present invention.

FIG. 3 is a schematic diagram illustrating an embodiment of an arithmetic system 3 according to the present invention. The arithmetic system 3 includes a data memory 30, a program memory 31, a processor 33, and an arithmetic device 32 that is the same as the arithmetic device 2.

The data memory 30 is used for storing data to be computed, middle results during computation and final results after computation.

The program memory 31 is used for storing control instruction sets.

The processor 33 is coupled with the data memory 30, the program memory 31 and the arithmetic device 32. The behavior of the processor is dictated by the control codes written by a programmer to directly perform arithmetic operations or control the arithmetic device to perform arithmetic operations.

In an embodiment, the processor 33 is a Reduced Instruction Set Computing (RISC) processor. The RISC architecture can be ARM instructions, including 25 instructions. LDR and STR are load and store instructions for exchanging external and internal data. LI, LSI, LLR, ADDI, ADD, SUBI, SUB, FMUL, ASR, LSR, LSL, MVN, AND, ORR are operations on register values. CMP is a status-change register instruction. B, BL, BR and B <cond> are control instructions for program flow. NOP indicates no operation, and Trap is the end of the program.

In summary, the arithmetic module, device and system according to the present invention have the footprint and power consumption reduced, while maintaining high accuracy required by digital signal processing through the use of static floating-point algorithm and a serial data connection design.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. An arithmetic module, comprising:
    a first adder including two input ends for receiving external data signals and an output end for outputting first addition result signals;
    a first shifter coupled to the output end of the first adder for receiving the first addition result signals generated by the first adder;
    a multiplier including a first input end coupled to the first shifter, a second input end for receiving an external coefficient, and an output end for outputting multiplication result signals;
    a digit alignment unit coupled to the output end of the multiplier for receiving the multiplication result signals generated by the multiplier to align digits of the multiplication result signals with those of input signals from an external accumulative register;
    a second adder including two input ends coupled to the digit alignment unit, and an output end for outputting second addition result signals; and
    a second shifter coupled to the output end of the second adder for receiving the second addition result signals generated by the second adder and outputting second shift result signals to the external accumulative register.

2. The arithmetic module of claim 1, wherein the digit alignment unit further includes:
    a multiplexer including a third input end for receiving the multiplication result signals from the multiplier, a fourth input end for receiving the input signals from the external accumulative register, and two output ends; and
    a third shifter coupled to one of the output ends of the multiplexer,
    wherein the second multiplexer selects the multiplication result signals from the multiplier or the input signals from the external accumulative register as input signals for the third shifter based on a predetermined control rule.

3. The arithmetic module of claim 1, wherein the first shifter and the second shifter normalize values of the first addition result signal and the second addition result signal to between 0.5 and 1, respectively.

4. The arithmetic device of claim 1, wherein the first shifter and the second shifter normalize values of the first addition result signals and the second addition result signals to between 0.5 and 1, respectively.

5. An arithmetic device, comprising:
    a controller including a plurality of input ends for receiving external signals and data, and a plurality of output ends for outputting result signals of the arithmetic device and control signals;
    a storage unit coupled to the controller for receiving the control signals from the controller and outputting stored microinstructions, data and coefficients accordingly; and
    an arithmetic module for receiving the microinstructions and data from the storage unit and performing arithmetic operations, comprising:
        a first adder including two input ends for receiving external data signals and an output end for outputting first addition result signals;
        a first shifter coupled to the output end of the first adder for receiving the first addition result signals generated by the first adder;
        a multiplier including a first input end coupled to the first shifter, a second input end for receiving an external coefficient, and an output end for outputting multiplication result signals;
        a digit alignment unit coupled to the output end of the multiplier for receiving the multiplication result signals generated by the multiplier to align digits of the multiplication result signals with those of input signals from an external accumulative register;
        a second adder including two input ends coupled to the digit alignment unit, and an output end for outputting second addition result signals; and
        a second shifter coupled to the output end of the second adder for receiving the second addition result signals generated by the second adder and outputting second shift result signals to the external accumulative register.

6. The arithmetic device of claim 5, wherein the controller further includes a control register for storing a head address, a tail address, a delay line start address, a delay line end address, a coefficient start address and a microinstruction start address.

7. The arithmetic device of claim 5, wherein the digit alignment unit further includes:
    a multiplexer including a third input end for receiving the multiplication result signals from the multiplier, a fourth input end for receiving the input signals from the external accumulative register, and two output ends; and
    a third shifter coupled to one of the output ends of the multiplexer,
    wherein the multiplexer selects the multiplication result signals from the multiplier or the input signals from the external accumulative register as input signals for the third shifter based on a predetermined control rule.

8. An arithmetic system comprising:
    a data memory;
    a program memory for storing control instruction sets;
    an arithmetic device, comprising:
        a controller including a plurality of input ends for receiving external signals and data, and a plurality of output ends for outputting result signals of the arithmetic device and control signals;
        a storage unit coupled to the controller for receiving the control signals from the controller and outputting stored microinstructions, data and coefficients accordingly; and
        an arithmetic module for receiving the microinstructions and data from the storage unit and performing arithmetic operations, the arithmetic module comprising:
            a first adder including two input ends for receiving external data signals and an output end for outputting first addition result signals;
            a first shifter coupled to the output end of the first adder for receiving the first addition result signals generated by the first adder;
            a multiplier including a first input end coupled to the first shifter, a second input end for receiving an external coefficient, and an output end for outputting multiplication result signals;
            a digit alignment unit coupled to the output end of the multiplier for receiving the multiplication result signals generated by the multiplier to align digits of the multiplication result signals with those of input signals from an external accumulative register;

a second adder including two input ends coupled to the digit alignment unit, and an output end for outputting second addition result signals; and a second shifter coupled to the output end of the second adder for receiving the second addition result signals generated by the second adder and outputting second shift result signals to the external accumulative register; and a processor coupled with the data memory, the program memory and the arithmetic device, the processor having a behavior dictated by control codes written by a programmer to directly perform arithmetic operations or control the arithmetic device to perform arithmetic operations.

9. The arithmetic system of claim 8, wherein the processor is a reduced instruction set computing (RISC) processor.

* * * * *